US011757624B2

(12) United States Patent
Aramaki (10) Patent No.: US 11,757,624 B2
(45) Date of Patent: Sep. 12, 2023

(54) DATA TRANSFER CONTROL DEVICE, DATA TRANSFER CONTROL SYSTEM, AND DATA TRANSFER CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yasuto Aramaki, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 278 days.

(21) Appl. No.: 16/798,478

(22) Filed: Feb. 24, 2020

(65) Prior Publication Data

US 2021/0091931 A1    Mar. 25, 2021

(30) Foreign Application Priority Data

Sep. 24, 2019    (JP) ................................ 2019-173569

(51) Int. Cl.
*H04L 9/08*    (2006.01)
*H04L 9/06*    (2006.01)
(Continued)

(52) U.S. Cl.
CPC ........ *H04L 9/0825* (2013.01); *G06F 9/30029* (2013.01); *G11C 11/4087* (2013.01);
(Continued)

(58) Field of Classification Search
CPC ... H04L 9/0825; H04L 9/0643; H04L 9/0869; H04L 9/3006; G06F 9/30029; G11C 11/4087
See application file for complete search history.

(56) References Cited

U.S. PATENT DOCUMENTS 6,101,586 A      8/2000  Ishimoto et al.
8,316,102 B2 *  11/2012  Matsuzaki .......... G06F 11/1451
                                                    709/217
(Continued)

FOREIGN PATENT DOCUMENTS

CN      103368944 A    * 10/2013
JP      H10228421 A      8/1998
(Continued)

*Primary Examiner* — Mohammed Waliullah
(74) *Attorney, Agent, or Firm* — Holtz, Holtz & Volek PC (57) ABSTRACT

According to an embodiment, a data transfer control device includes a controller, and the controller generates tag information when the controller receives a tag generation request, and encrypts the tag information, transmits the encrypted tag information to a device that transmits the tag generation request, processes data stored at a predetermined address to generate data for transmission when an address at which the data related to the data transfer request is stored includes the predetermined address, scrambles or encrypts the data for transmission using the tag information, and transmits the scrambled or encrypted data to the device.

17 Claims, 10 Drawing Sheets

(51) Int. Cl.
*G06F 9/30* (2018.01)
*H04L 9/30* (2006.01)
*G11C 11/408* (2006.01)

(52) U.S. Cl.
CPC .......... *H04L 9/0643* (2013.01); *H04L 9/0869* (2013.01); *H04L 9/3006* (2013.01)

(56) References Cited

U.S. PATENT DOCUMENTS

| | | | | |
|---|---|---|---|---|
| 2006/0080732 | A1* | 4/2006 | Ohkubo | G07F 7/1008 |
| | | | | 726/9 |
| 2013/0285795 | A1* | 10/2013 | Virtanen | G01K 7/32 |
| | | | | 29/601 |
| 2019/0205865 | A1* | 7/2019 | Jamkhedkar | G06K 19/06037 |
| 2020/0228505 | A1* | 7/2020 | Lapidous | H04L 63/166 |

FOREIGN PATENT DOCUMENTS

| | | | |
|---|---|---|---|
| JP | 2000242457 A | * | 9/2000 |
| JP | 2005339148 A | * | 12/2005 |
| JP | 2006154466 A | | 6/2006 |
| JP | 2008312156 A | | 12/2008 |
| JP | 4811840 B2 | | 9/2011 |

* cited by examiner

DATA TRANSFER CONTROL DEVICE, DATA TRANSFER CONTROL SYSTEM, AND DATA TRANSFER CONTROL METHOD

CROSS-REFERENCE TO RELATED APPLICATION

This application is based upon and claims the benefit of priority from the prior Japanese Patent Application No. 2019-173569 filed in Japan on Sep. 24, 2019; the entire contents of which are incorporated herein by reference.

FIELD

An embodiment described herein relates generally to a data transfer control device, a data transfer control system, and a data transfer control method.

BACKGROUND

A storage device is connected to a computer and is used for storing various kinds of data. If the storage device has caused a malfunction, a manufacturer of the storage device repairs the storage device. Typically, the manufacturer of the storage device analyzes log data and the like of the storage device that has caused the malfunction to inspect reasons of the malfunction.

For example, inspection information such as log data for inspecting the reasons of the malfunction is transmitted from a server of a customer to a server of the manufacturer via a network. Since the inspection information may include confidential information and the like related to the storage device, authentication is performed between the servers, and the inspection information is then encrypted and transmitted.

However, the customer may not desire to transmit the inspection information to the manufacturer from the viewpoint of information security. In such a case, since a service engineer from the manufacturer is required to visit the customer to acquire and analyze the inspection information, and further, the service engineer is required to pay attention to an access to the confidential information when acquiring the inspection information, the service engineer cannot quickly inspect the reasons of the malfunction.

DETAILED DESCRIPTION

A data transfer control device according to an embodiment is a data transfer control device that has a controller and controls transfer of data stored in a memory device in response to a data transfer request, the controller generates tag information when the controller receives a tag generation request, and encrypts the tag information, transmits the encrypted tag information to a device that transmits the tag generation request, processes data stored at a predetermined address from the data related to the data transfer request to generate data for transmission when an address at which the data related to the data transfer request is stored includes the predetermined address, scrambles or encrypts the data for transmission using the tag information, and transmits the scrambled or encrypted data to the device.

Hereinafter, the embodiment will be described with reference to drawings.

(Configuration)

Figure 1:
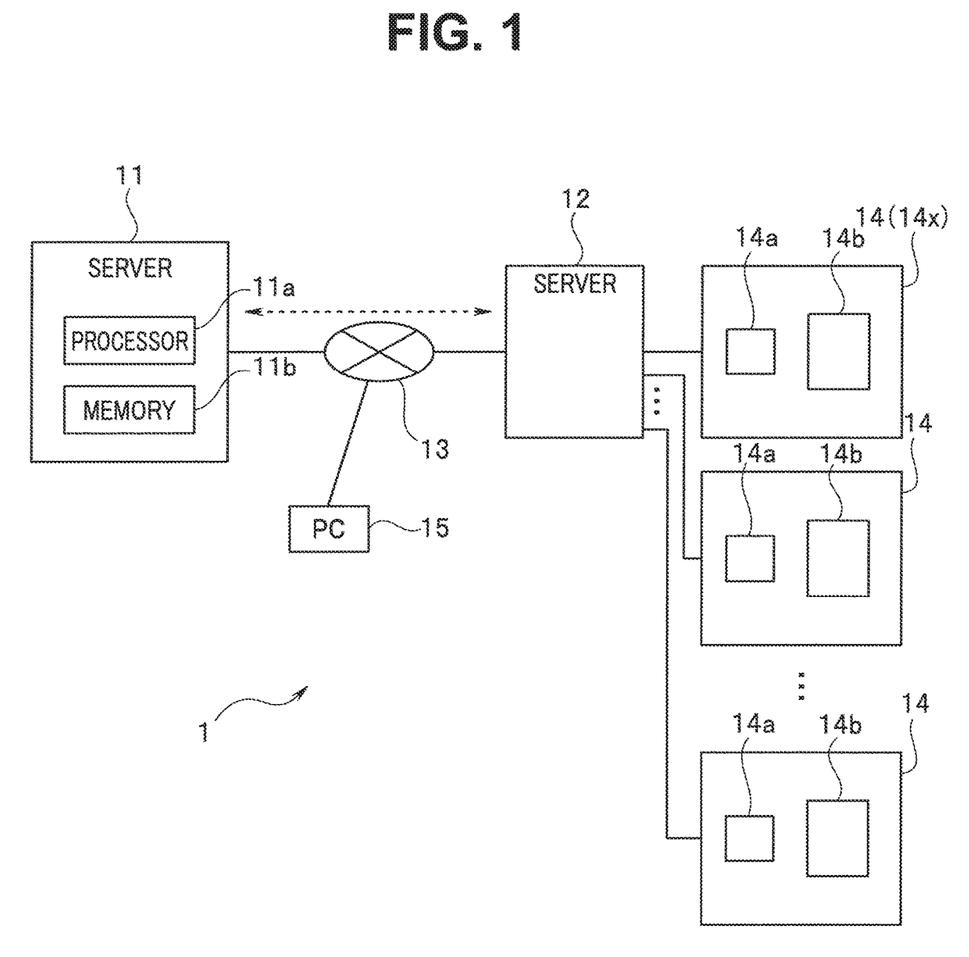
FIG. 1 is a configuration diagram of a data transfer control system according to an embodiment.

FIG. 1 is a configuration diagram of a data transfer control system according to the embodiment. A data transfer control system 1 includes a serve device (hereinafter, referred to as a server) 11 and a server 12. The server 11 is managed by a manufacturer A.

The server 12 is managed by a customer B that has a data center, for example. A plurality of storage devices 14 are connected to the server 12. The data center that the customer B manages is configured to include the server 12 and the plurality of storage devices 14.

The servers 11 and 12 are communicably connected to each other via a network 13 such as the Internet. Although the server 11 is communicably connected to one server 12 in FIG. 1, the server 11 is also communicably connected to servers (not illustrated) of one or more other customers.

The server 11 has a processor 11a and a memory 11b. The memory 11b stores an acquisition program for acquiring inspection information such as operation log data of the respective storage devices 14, an analysis program for analyzing the acquired inspection information, and the like.

Each of the storage devices 14 include controller 14a and memory device 14b. The memory device 14b are NAND-type flash memory, hard disk drive, or the like. The controller 14a is data transfer control device controlling transfer of data stored in the memory device 14b in response to a data transfer request.

A personal computer (hereinafter, referred to as a PC) 15 that a service engineer from the manufacturer A owns can also communicate with the servers 11 and 12 via the network 13. If the storage device 14 causes a malfunction, for example, the customer B lets the manufacturer A know the occurrence of the malfunction. The manufacturer A issues, via an email or the like for a service engineer from the manufacturer A, a transfer request or the like to the storage device 14 that has caused the malfunction for inspection information such as operation log data for inspecting the reasons of the malfunction.

The operation log data is an operation history or the like of the memory device 14b and is automatically stored in a predetermined storing region in the memory device 14b such that the latest operation log data in a predetermined period of time is stored. In other words, the memory device 14b has a region for storing system data for the storage device 14 to operate, the operation log data, and the like and a region for storing data.

Note that the inspection information transmission request from the manufacturer A to the storage device 14 of the customer B, the inspection information from the storage device 14 to the manufacturer A, and the like may be transmitted directly between the server 11 and the server 12 as represented by the dashed line in FIG. 1. Therefore, the data transfer control system 1 includes the storage devices 14 including the memory devices 14b and the server 11 or the PC 15 that can communicate with the storage devices 14.

Figure 2:
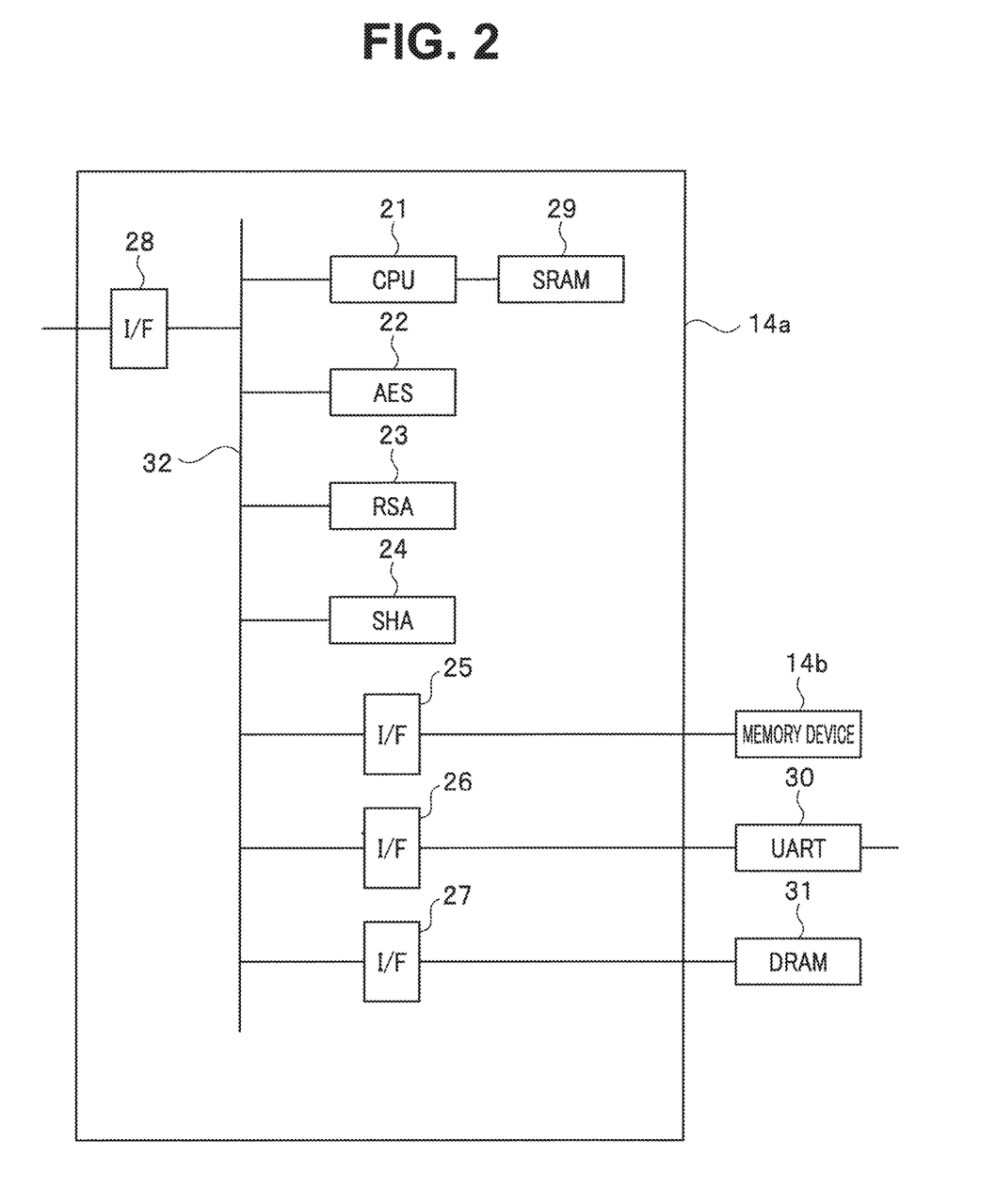
FIG. 2 is a block diagram illustrating a configuration of a storage device according to the embodiment.

FIG. 2 is a block diagram illustrating a configuration of a storage device 14. The storage device has a central processing unit (hereinafter, referred to as a CPU) 21, an advanced encryption standard (AES) circuit (hereinafter, abbreviated as AES) 22, a Rivest-Shamir-Adelman cryptosystem (RSA) circuit (hereinafter, abbreviated as RSA) 23, a secure hash algorithm (SHA) circuit (hereinafter, abbreviated as SHA) 24, interfaces (hereinafter, abbreviated as I/Fs) 25 to 28, a static random access memory (SRAM) 29, a universal asynchronous receiver/transmitter (UART) circuit (hereinafter, abbreviated as UART) 30, a dynamic random access memory (DRAM) 31, and the memory device 14b. The CPU 21, the AES 22, the RSA 23, the SHA 24, and the I/Fs 25 to 28 are connected to each other via an internal bus 32.

For example, the CPU 21, the AES 22, the RSA 23, the SHA 24, the I/Fs 25 to 28, the SRAM 29 and the internal bus 32 are formed as a system-on-a-chip (SoC) semiconductor device.

Some storage devices 14 are encryption devices of a type that encrypts plaintext data while other storage devices 14 are non-encryption devices of a type that does not perform encryption. The AES 22 is an AES encryption device based on the AES scheme in which the plaintext data is encrypted using a common key. When the storage device 14 is an encryption device 14, the storage device 14 has the AES 22. The AES 22 is used for encrypting data stored in the memory device 14b. When the storage device 14 is a non-encryption device, the storage device 14 does not have the AES 22.

When the storage device 14 is an encryption device, an encryption key as parameter data for encryption is included in the storage device 14. The parameter data is confidential information.

The RSA 23 is an RSA encryption device configured to encrypt tag information TAG of plaintext data using a public key for asymmetric key encryption processing. The SHA 24 is an operational device configured to calculate a hash value for given data. For example, the SHA 24 uses a hash function of SHA-256. Note that the RSA 23 and the SHA 24 are also used for authentication when firmware (FW) of the controller 14a is updated.

The I/F 25 is an interface for the memory device 14b. The I/F 26 is an interface for the UART 30. The I/F 27 is an interface for the DRAM 31. The I/F 28 is an interface of a SAS or SATA standard for the server 12 that serves as a host.

The SRAM 29 is a volatile memory, serves as a main memory for the CPU 21, and stores a control program and various information required for operations of the storage device 14. If the storage device 14 is activated, then the control program and the like stored in the memory device 14b is stored in the SRAM 29 via the I/F 25. Note that the SRAM 29 also stores firmware information (FW) of the storage device 14, which can be updated from the server 11.

The UART 30 is connected to an external terminal (not illustrated) for connection to the internal bus 32. The UART 30 is a circuit with which the PC 15 communicates directly with the CPU 21. The UART 30 is used by connecting the PC 15 to the external terminal with an RS232C cable or the like when the storage device 14 cannot communicate with the PC 15 due to a failure of the I/F 28 or the like, for example. In other words, the UART 30 is a circuit for connecting the PC 15 and the storage device 14 directly to each other.

The DRAM 31 is used as a buffer memory. When an inspection information request command LRC for requesting for transfer of the inspection information is received from the PC 15, the CPU 21 reads the requested inspection information from the memory device 14b and the SRAM 29 and temporarily stores the inspection information in the DRAM 31. The CPU 21 generates data for transmission from the inspection information and stores the data for transmission in the DRAM 31.

The inspection information request command LRC includes address information of the inspection information as a target of the transfer request. The address information includes an address of at least one of the memory device 14b and the SRAM 29. The address information may include a plurality of addresses indicating ranges of storing regions in which log data of commands executed by the storage device 14 is stored and one or more addresses of the storing regions in which specific states or values in programs executed by the SRAM 29 are stored, for example.

The SRAM 29 stores mask region information MAI read from the memory device 14b when the storage device 14 is activated. The mask region information MAI is address information of a storing region in which an encryption key used when data is encrypted, PIN information, and the like are stored, for example. The CPU 21 generates inspection information IS such that the requested inspection information does not include data in the storing region specified by the mask region information MAI.

The CPU 21 outputs inspection information ISs obtained by scrambling the inspection information IS (hereinafter, referred to as scrambled inspection information) as transmission data to the I/F 28. The scrambled inspection information ISs is transmitted to the PC 15. Note that when the inspection information request command LRC is received via the UART 30, the CPU 21 outputs the scrambled inspection information ISs to the UART 30.

The server 11 descrambles the scrambled inspection information ISs from the storage device 14 and can thus obtain the inspection information IS. The server 11 has various functions for analyzing the obtained inspection information IS and inspecting the reasons of the malfunction. The storage device 14 also has various functions for transmitting the inspection information to the server 11.

Figure 3:
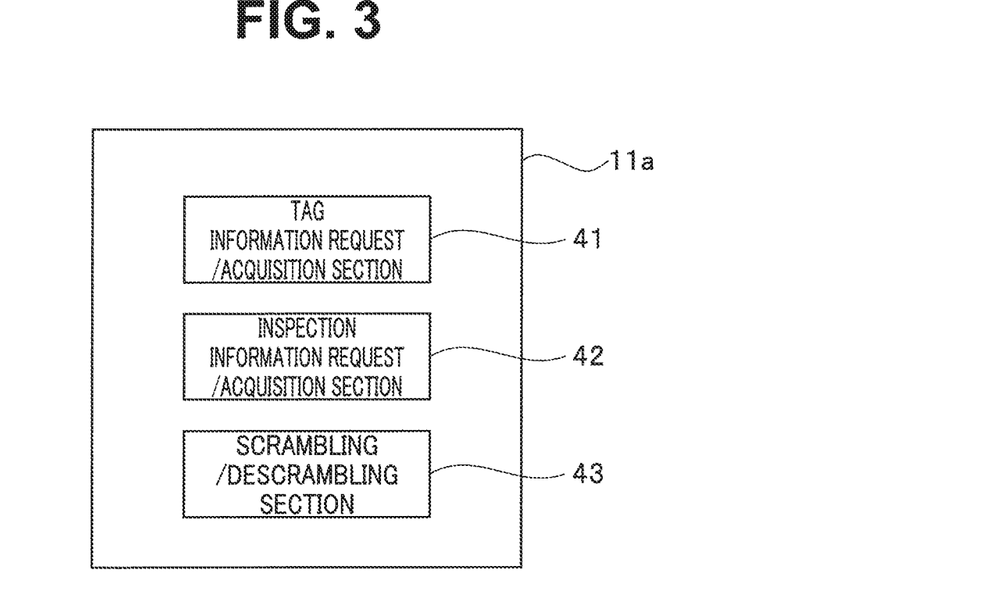
FIG. 3 is a block diagram illustrating functions that a processor of a server of a manufacturer has according to the embodiment.

FIG. 3 is a block diagram illustrating functions that the processor 11a has. The processor 11a has a tag information request/acquisition section 41 configured to request and acquire tag information, an inspection information request/acquisition section 42 configured to request and acquire the inspection information, and a scrambling/descrambling section 43 configured to scramble and descramble data.

The processor 11a includes a CPU, a ROM, a RAM, and the like. By the CPU of the processor 11a reading necessary programs from the memory 11*b* and the ROM and developing and executing the programs in the RAM, functions of the respective components, namely the tag information request/acquisition section 41, the inspection information request/acquisition section 42, and the scrambling and descrambling section 43 are realized.

The tag information request/acquisition section 41 transmits an email or the like for issuing a tag information request to the PC 15 and processes an email or the like for acquiring data related to the tag information from the PC 15. In such a case, the PC 15 transmits a tag information request command TRC to the server 12 and acquires the data related to the tag information from the server 12.

Note that when the server 11 transmits the tag information request command TRC directly to the server 12, the tag information request/acquisition section 41 also includes processing of transmitting the tag information request command TRC to the server 12 and acquiring the data related to the tag information from the server 12.

Further, the inspection information request/acquisition section 42 transmits an email or the like for issuing an inspection information request to the PC 15 and processes an email or the like for acquiring data related to the inspection information from the PC 15. In such a case, the PC 15 transmits the inspection information request command LRC to the server 12 and acquires the data related to the inspection information from the server 12.

Note that the inspection information request/acquisition section 42 includes processing of transmitting the inspection information request command LRC to the server 12 and acquiring the data related to the inspection information from the server 12 when the server 11 transmits the inspection information request command LRC directly to the server 12.

Note that although the respective functions of the tag information request/acquisition section 41, the inspection information request/acquisition section 42, and the scrambling/descrambling section 43 are realized by software using the CPU of the processor 11*a*, the processor 11*a* may realize all or some of the respective functions using an electronic circuit such as a field programmable gate array (FPGA).

Figure 4:
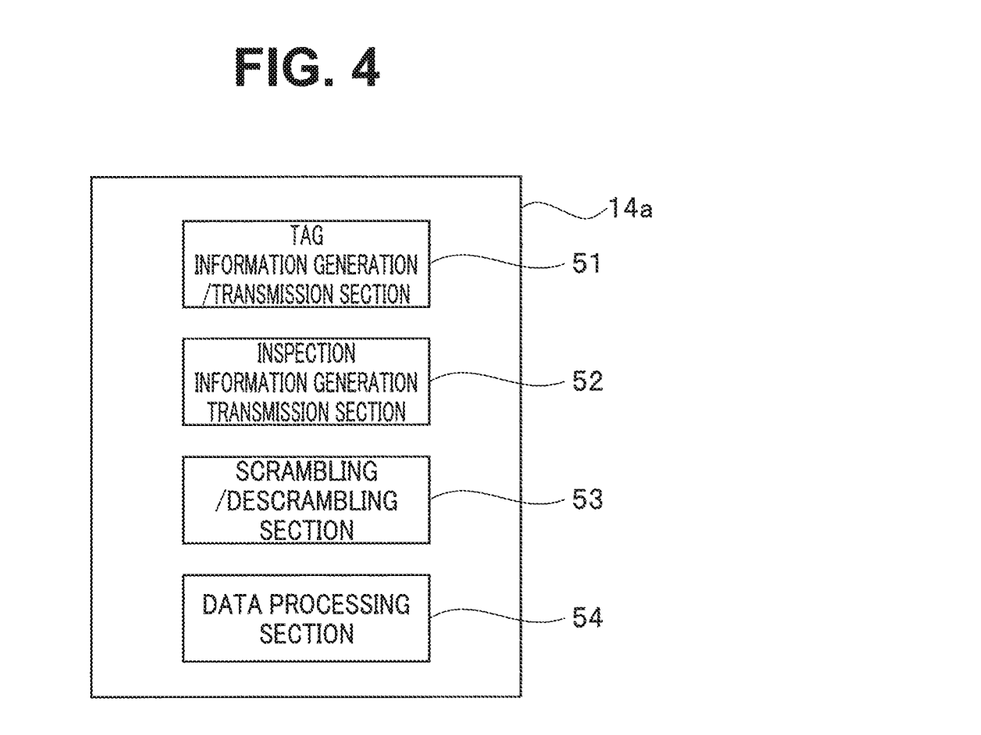
FIG. 4 is a block diagram illustrating functions that a controller of the storage device has according to the embodiment.

FIG. 4 is a block diagram illustrating functions that the controller 14*a* has. The controller 14*a* has a tag information generation/transmission section 51 configured to generate and transmit the tag information TAG, an inspection information generation/transmission encrypting configured to generate and transmit the inspection information IS, a scrambling/descrambling section 53 configured to scramble/descramble data, and a data processing section 54 configured to process transmission data. By the CPU 21 reading necessary programs from the memory device 14*b* and developing and executing the programs in the SRAM 29, the respective functions of the tag information generation/transmission section 51, the inspection information generation/transmission section 52, the scrambling/descrambling section 53, and the data processing section 54 are realized.

Note that although some of the functions of the tag information generation/transmission section 51, the inspection information generation/transmission section 52, the scrambling/descrambling section 53, and the data processing section 54 are realized by software using the CPU 21, all or some of the respective functions of the controller 14*a* as a processor may be realized by an electronic circuit such as the FPGA.

Effects

Next, inspection information transmission processing performed in the data transfer control system 1 when one of the plurality of storage devices 14 causes a malfunction will be described. Various malfunctions such as a malfunction that the storage device 14 is not activated and a malfunction that data cannot be read occur as a malfunction of the storage device 14.

[Transmission and Reception of Tag Data]

Figure 5:
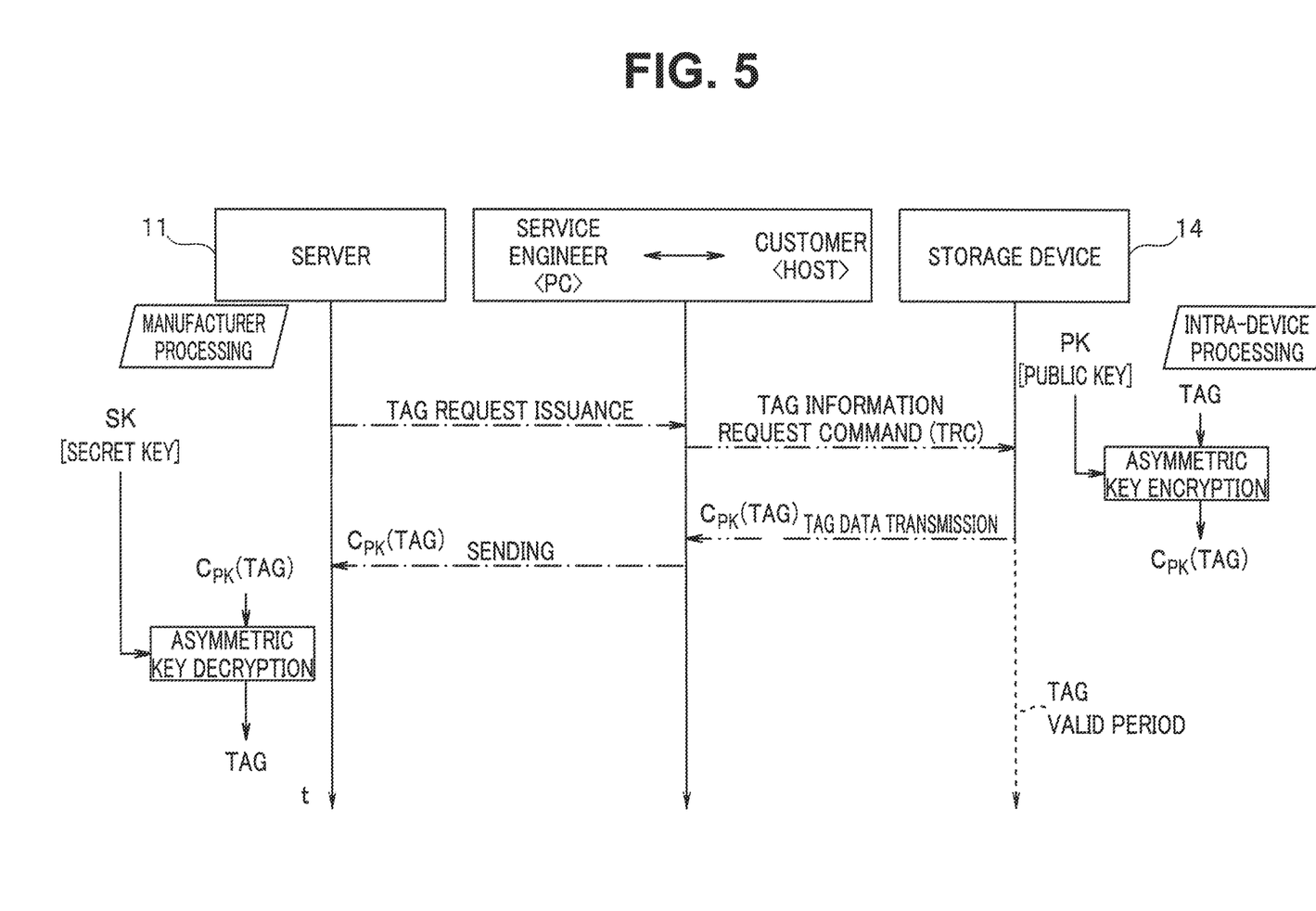
FIG. 5 is a sequence diagram illustrating a flow from a request to transmission of tag information according to the embodiment.

FIG. 5 is a sequence diagram illustrating a flow from a request to transmission of the tag information TAG. The processing in FIG. 5 is executed by the tag information request/acquisition section 41 and the scrambling/descrambling section 43 of the server 11 and the tag information generation/transmission section 51 and the scrambling/descrambling section 53 of the storage device 14. If one of the plurality of storage devices 14, for example, a storage device 14*x* in FIG. 1 causes a malfunction, the customer B requests repairment from the manufacturer A.

The manufacturer A lets a service engineer know the issuance of the tag request for requesting the tag information TAG. The manufacturer A notifies the service engineer of the issuance of the tag request via an email, for example. In FIG. 5, the one-dotted dash line represents transmission and reception of data through an email, a server mail, or the like while the two-dotted dash line represents transmission and reception of a command or the like performed by the I/F 28 or the UART 30.

The service engineer transmits the tag request command TRC from the PC 15 to the storage device 14*x*, which has caused the malfunction, via the server 12 on the basis of the issuance of the tag request. Note that although the tag request command TRC is transmitted from the PC 15 to the controller 14*a* of the storage device 14*x*, the tag request command TRC may be transmitted directly from the server 11.

If the CPU 21 of the storage device 14*x* receives the tag request command TRC, then the CPU 21 executes a program for the tag information generation/transmission section 51 and generates the tag information TAG. The tag information TAG is stored in the SRAM 29. The tag information generation/transmission section 51 uses a random numerical value generated by a random number generation program as the tag information TAG.

Here, the tag information TAG is stored in the SRAM 29 in order that the tag information TAG is deleted when the storage device 14*x* is stolen. Since the tag information TAG is deleted from the SRAM 29 when the power of the storage device 14 is turned off, a third person cannot decrypt the encrypted inspection information and the like. Further, the service engineer can also intentionally delete the tag information TAG by turning off the power of the storage device 14 in a remote manner using a predetermined command or resetting the storage device 14. Also, the customer B can also intentionally and quickly delete the tag information TAG by turning off the power of the storage device 14 or resetting the storage device 14.

When the manufacturer A acquires the inspection information and the like again after the power of the storage device 14 is turned off or the storage device 14 is reset, tag information TAG of a new value is generated. The server 11 can acquire the inspection information IS using the new tag information TAG.

The controller 14*a* has a public key PK for asymmetric encryption of the RSA 23 in advance. The CPU 21 transmits tag data CPK (TAG) obtained by concealing the generated tag information TAG with the public key PK to the PC 15. In other words, the tag information TAG is encrypted, and the tag data CPK (TAG), which is encrypted tag information, is generated in the asymmetric key encryption processing.

The tag information TAG, which is a random numerical value, is encrypted by being concealed with the public key.

The generation of the tag information TAG and the transmission of the tag data CPK (TAG) are performed by the tag information generation/transmission section 51. Accordingly, the tag information generation/transmission section 51 constitutes a tag information transmission section configured to generate the tag information TAG when the tag information generation/transmission section 51 receives a tag generation request and transmit the encrypted tag information (tag data CPK (TAG)), which is obtained by encrypting the tag information TAG, to the device that has transmitted the tag generation request (the PC 15 in this case).

After the tag data CPK (TAG) is transmitted to the PC 15, the tag information TAG becomes valid in the storage device 14. The encryption processing of generating the tag data CPK (TAG) from the tag information TAG with the public key PK is performed using the RSA 23.

The service engineer transmits the received tag data CPK (TAG) to the server 11. The manufacturer A has a secret key SK of asymmetric encryption corresponding to the public key PK in advance. Therefore, the server 11 can obtain plaintext tag information TAG by decrypting the received tag data CPK (TAG) with the secret key SK. The tag information request/acquisition section 41 performs processing of acquiring the plaintext tag information TAG by decrypting the tag data CPK (TAG) with the secret key SK.

Therefore, even if a third person acquires the tag data CPK (TAG), the third person cannot acquire the tag information TAG without the secret key SK since the tag data CPK (TAG) is encrypted with the public key PK of the asymmetric encryption. As a result, it is possible to prevent imperilment of data in the storage device 14 including data of other customers. The acquired tag information TAG is used in scrambling processing.

[Transmission and Reception of Inspection Information]

Figure 6:
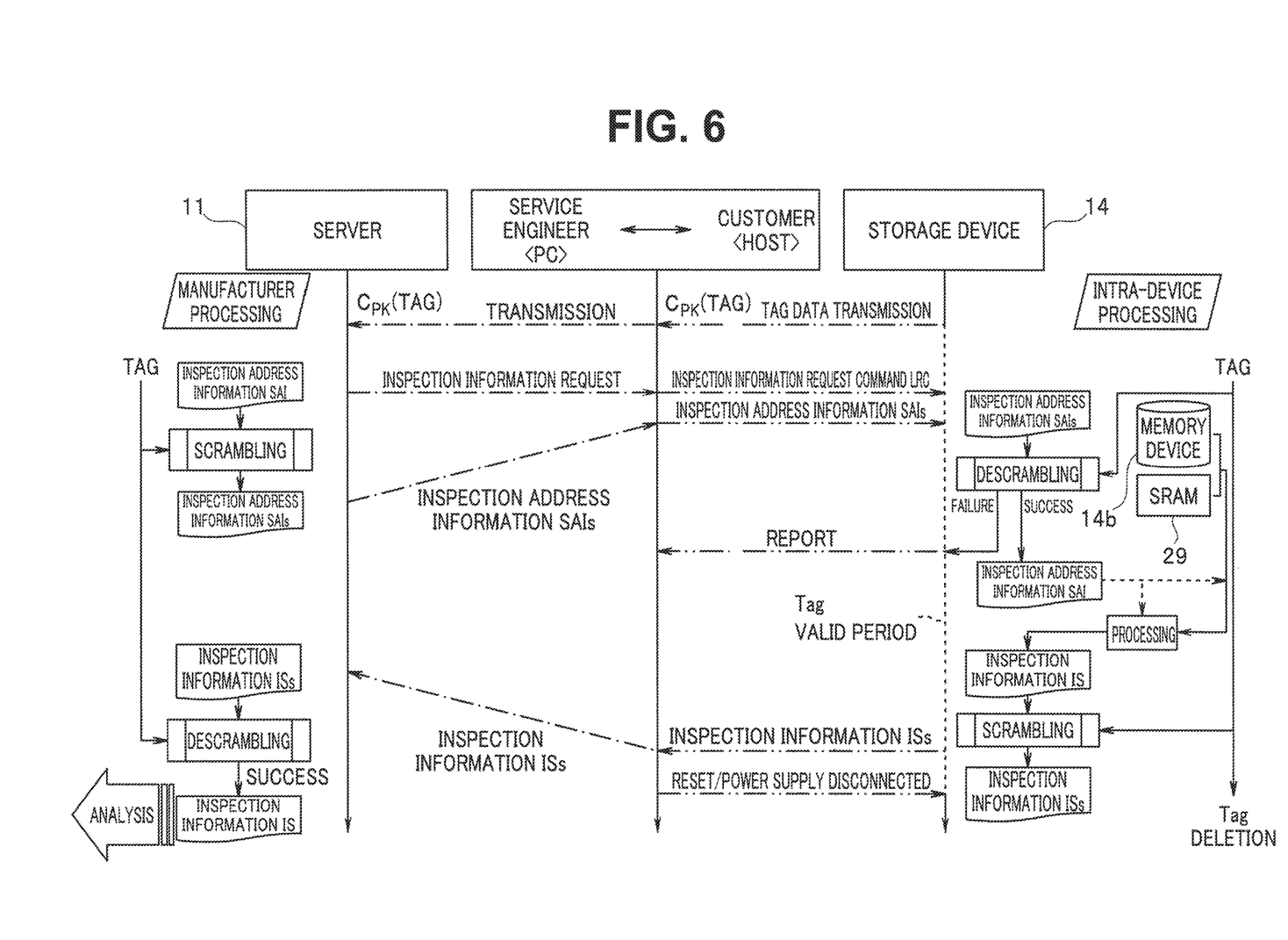
FIG. 6 is a sequence diagram illustrating a flow from an inspection information transfer request to inspection information transmission according to the embodiment.

Next, a processing sequence in which the manufacturer A requests and acquires the inspection information IS will be described. FIG. 6 is a sequence diagram illustrating a flow from a transfer request to transmission of the inspection information. The processing in FIG. 6 is executed by the inspection information request/acquisition section 42 and the scrambling/descrambling section 43 of the server 11 and the inspection information generation/transmission section 52, the scrambling/descrambling section 53, and the data processing section 54 of the storage device 14.

If the manufacturer A acquires the tag information TAG, then the manufacturer A lets the service engineer to know the issuance of the inspection information request for requesting the inspection information. The manufacturer A notifies the service engineer of the issuance of the inspection information request via an email or the like, for example. In FIG. 6, the one-dotted dashed line represents transmission and reception through an email, a server mail, or the like while the two-dotted dashed line represents transmission and reception performed by the I/F 28 or the UART 30.

Further, the manufacturer A also lets the service engineer know inspection address information SAI storing information that is effective for inspecting the reasons of the malfunction of the storage device 14x that has caused the malfunction. The inspection address information SAI includes address information of at least one of the memory device 14b and the SRAM 29. The inspection address information SAI is information of an address of a memory region in which data that is effective for inspecting the reasons of the malfunction is stored and is a specific address, an address indicating a specific range, or the like.

For example, the inspection address information SAI is range information of addresses in the memory device 14b, at which a predetermined number of operation log data items immediately before the malfunction or the operation log data in a predetermined period is stored, an address in the SRAM 29, at which a value included in a program that is being executed is stored, or the like.

Figure 7:
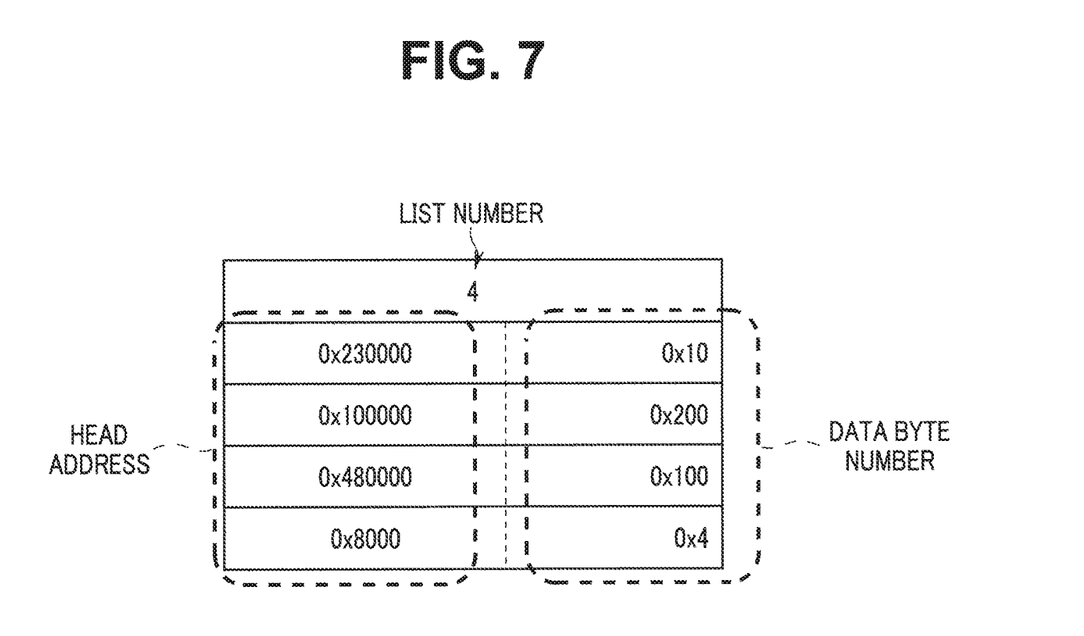
FIG. 7 is a diagram illustrating a configuration example of inspection address information according to the embodiment.

FIG. 7 is a diagram illustrating a configuration example of the inspection address information SAI. The inspection address information SAI in FIG. 7 is list data in which a head address of a storing region in the memory device 14b storing the inspection information and a data byte number that is continuous with the head address are associated as a pair of data items. The inspection address inspection SAI includes a list number, one head address or two or more head addresses, and data of one data byte number or of two or more data byte numbers. Note that the inspection address information SAI may have a configuration other than the configuration in FIG. 7.

The service engineer transmits the inspection information request command LRC from the PC 15 to the storage device 14x. Note that although the inspection information request command LRC is transmitted from the PC 15 of the service engineer to the controller 14a of the storage device 14x, the inspection information request command LRC may be transmitted directly from the server 11 to the storage device 14x.

As described above, the PC 15 (or the server 11) transmits the tag generation request to the storage device 14 and then transmits the data transfer request to the storage device 14. In a case of the server 11, the data transfer request is executed by the inspection information request/acquisition section 42.

[Scrambling of Inspection Address Information in Server 11]

The inspection address information SAI is scrambled and transmitted to the storage device 14 since the inspection address information SAI is also confidential information in a sense. The inspection address information SAI is scrambled (encrypted) by the scrambling/descrambling section 43 using the tag information TAG in the server 11. The scrambled inspection address information (hereinafter, referred to as scrambled inspection address information) SAIs is transmitted from the server 11 to the PC 15.

The processing is executed by the inspection information request/acquisition section 42 and the scrambling/descrambling section 43. Therefore, the inspection information request/acquisition section 42 and the scrambling/descrambling section 43 constitute an encrypted address information transmission section configured to transmit an address scrambled using the decrypted tag information TAG as encrypted address information to the PC 15.

The service engineer transmits the inspection information request command LRC and the scrambled inspection address information SAIs from the PC 15 to the storage device 14x. At this time, the service engineer and the customer B cannot know the inspection address information SAI since the inspection address information SAI has been scrambled.

Figure 8:
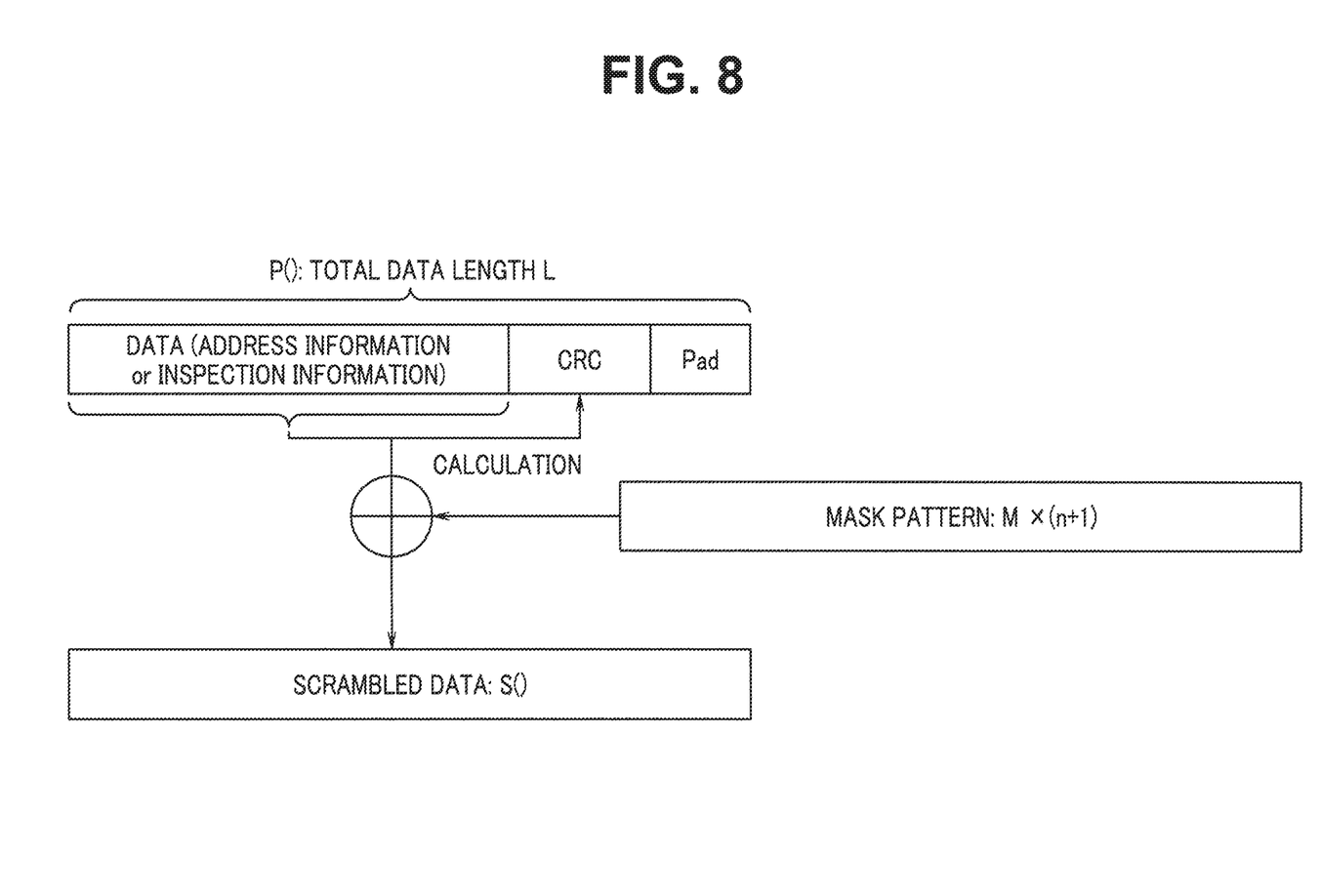
FIG. 8 is a diagram for explaining a processing example in which plaintext data is scrambled to generate scrambled data according to the embodiment.

FIG. 8 is a diagram for explaining a processing example in which the plaintext data is scrambled to generate scrambled data. The data to be scrambled is a plaintext including a data portion, a CRC portion, and a Pad portion. The data portion stores the inspection address information SAI. The CRC portion stores a CRC value for a cyclic redundancy check generated for the data portion. The Pad portion stores data for adjusting a data length. Note that a hash value may be used for error inspection instead of the CRC value.

The scrambled plaintext is divided into a plurality of plaintext data items P(0), P(1), P(2), ... P(n). If the plaintext is divided by a 32-byte length, for example, n is ((L/32)−1). L is a total data length of the data to be scrambled.

As illustrated in FIG. 8, a plurality of scrambled data items are generated by obtaining exclusive ORs between the respective plaintext data items and a 32-byte mask pattern M. Specifically, data obtained by scrambling the respective plaintext data items is generated using a new mask pattern M generated by setting an initial value of the mask pattern M to "0" and hashing data of an exclusive OR between the mask pattern M and the tag information TAG. In other words, the data for transmission is scrambled using the mask pattern M generated by hashing the tag information TAG with a hash function. The mask pattern M is generated with a hash function that is the same as the hash function of the SHA 24.

For example, the respective scrambled data items are calculated using the following equation (program).

M=0
for i=0 to n
M=Hash (M xor TAG)
S(i)=P(i) xor M

Here, i is a counter that changes from 0 to n. S(i) is scrambled data corresponding to each plaintext data item P(i).

[Descrambling of Inspection Address Information in Storage Device 14]

If the storage device 14 receives the scrambled inspection address information SAIs from the PC 15, then the controller 14a performs descrambling using the tag information TAG to generate the inspection address information SAI. The descrambling using the tag information TAG is executed by the scrambling/descrambling section 53.

Figure 9:
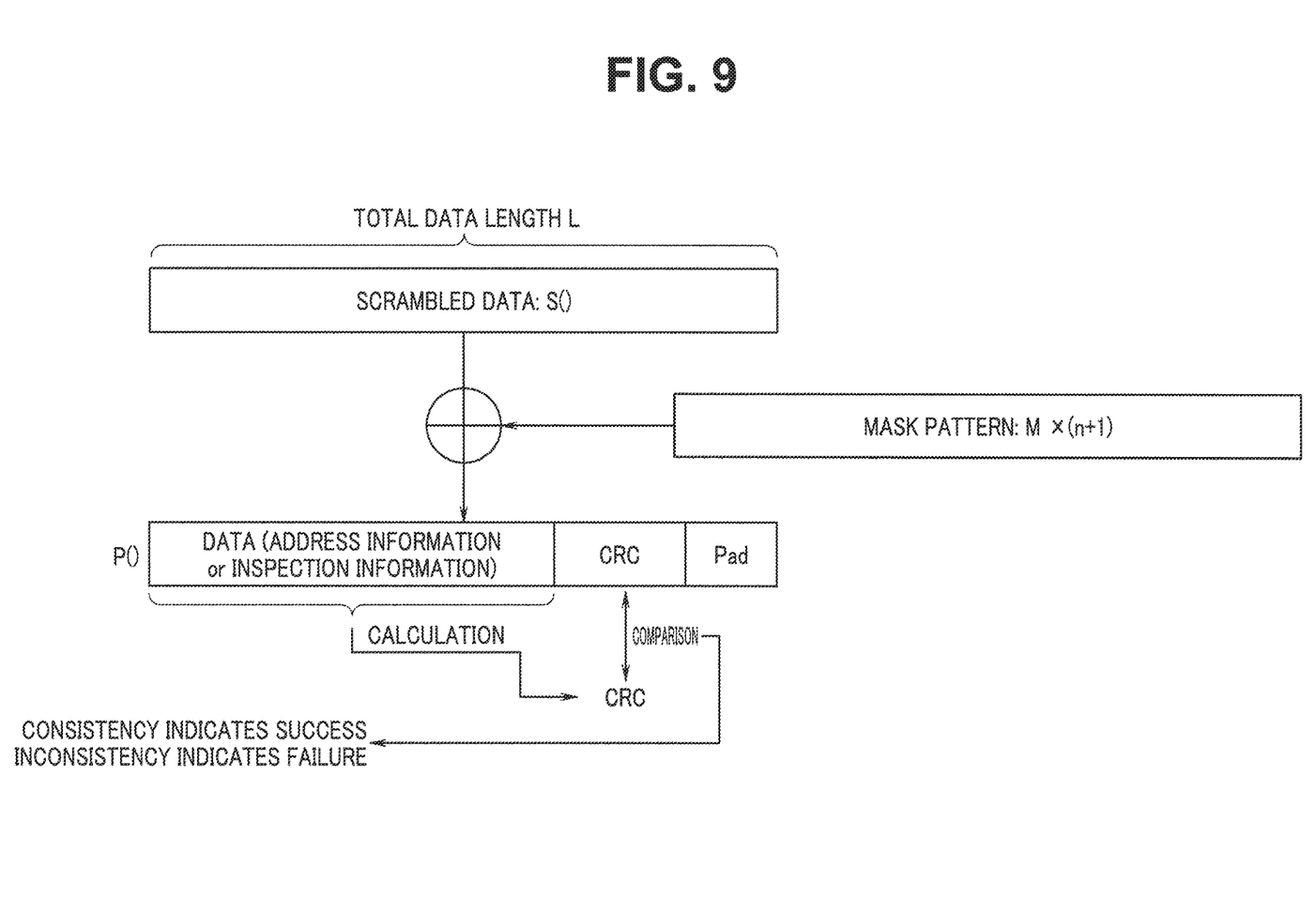
FIG. 9 is a diagram for explaining a processing example in which the scrambled data is descrambled to generate plaintext data according to the embodiment.

FIG. 9 is a diagram for explaining a processing example in which the scrambled data is descrambled to generate plaintext data. A descrambled plaintext is generated by obtaining an exclusive OR with the mask pattern M for each of the divided scrambled data items. Specifically, the plaintext data of the scrambled data is generated using the new mask pattern M generated by setting an initial value of the mask pattern M to "0" and hashing data of an exclusive OR between the mask pattern M and the tag information TAG. Each plaintext data item of the scrambled data is generated using the newly generated mask pattern for each of the divided scrambled data items. The mask pattern M is hashed by the SHA 24.

For example, each plaintext data item is calculated using the following equation (program).

M=0
for i=0 to n
M=Hash (M xor TAG)
P(i)=S(i) xor M

Since the scrambled inspection address information SAIs is descrambled using the SHA 24, the storage device 14 can acquire plaintext inspection address information SAI. The controller 14a stores the inspection address information SAI in the SRAM 29.

The inspection information generation/transmission section 52 and the scrambling/descrambling section 53 of the storage device 14 constitute an address acquisition section configured to acquire the inspection address information SAI by decrypting the scrambled inspection address information SAIs using the tag information TAG.

The CRC performs error detection of the inspection address information SAI. If an error is detected, then the controller 14a notifies the PC 15 of report data indicating that the descrambling has failed. As a result, the server 11 or the PC 15 can transmit the scrambled inspection address information SAIs again.

[Generation of Inspection Information in Storage Device 14]

As described above, the controller 14a acquires data regarding an address designated by the inspection address information SAI. Then, the CPU 21 reads the inspection information IS from the memory device 14b and the SRAM 29 on the basis of the inspection address information SAI and temporarily stores the inspection information IS in the DRAM 31.

At this time, the CPU 21 executes a processing process of not including the data in the storing region designated by the mask region information MAI in the inspection information IS with reference to the mask region information MAI stored in the SRAM 29.

Figure 10:
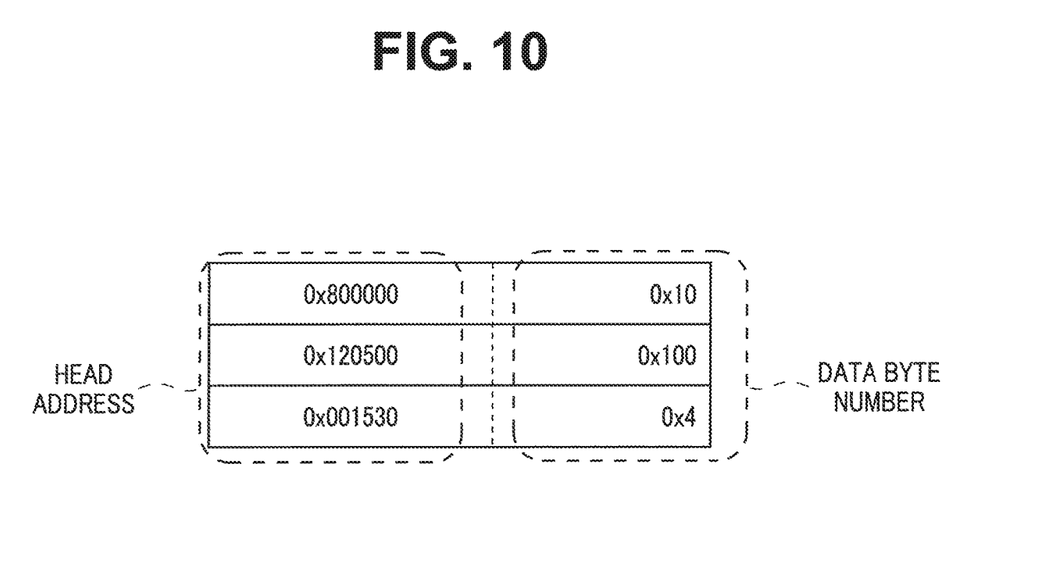
FIG. 10 is a diagram illustrating a configuration example of mask region information according to the embodiment.

FIG. 10 is a diagram illustrating a configuration example of the mask region information MAI. The mask region information MAI is list data in which a head address of a storing region storing information such as an encryption key for user data and PIN information in the memory device 14b and a data byte number that is continuous with the head address are associated with a pair of data items. The mask region information MAI in FIG. 10 includes one head address or two or more head addresses and data of one data byte number or two or more data byte numbers. Note that the configuration of the mask region information MAI may be a configuration other than the configuration illustrated in FIG. 10.

The CPU 21 reads the inspection information from the memory device 14b and the SRAM 29 when the address of the mask region information MAI is included in the inspection address information SAI. The CPU 21 deletes the data of the mask region information MAI from the read inspection information and stores the inspection information in the DRAM 31. Alternatively, the CPU 21 reads the inspection information except for the data of the mask region information MAI and stores the inspection information in the DRAM 31. The inspection information IS includes the operation log data and the like of the storage device 14.

In other words, the CPU 21 generates the inspection information IS by processing the inspection information IS so as not to include the data in the storing region designated by the mask region information MAI in the inspection information IS in a case of data in the storing region designated by the inspection address information SAI. In other words, the data designated by the mask region information MAI is not transmitted from the storage device 14 to the PC 15 even if the data is designated by the inspection address information SAI. Therefore, inclusion and an output of data such as an encryption key for user data and PIN information in the inspection information IS are inhibited. The data processing section 54 executes the deletion of the data in the storing region designated by the mask region information MAI.

Note that although the CPU 21 causes the data in the storing region designated by the mask region information MAI not to be included in the inspection information IS, another method may be used for inhibiting an output of data such as an encryption key for encrypting user data and PIN information.

For example, when the inspection address information SAI includes the address of the mask region information MAI, data of the address of the mask region information MAI may be changed to a specific value, for example, "0x0000" or "0xFFFF" in a first modification example.

Alternatively, when the inspection address information SAI includes the address of the mask region information MAI, the inspection information request command LRC may be invalidated, a status of a command is set to be an error, and an error code may be replied to the PC 15 in a second modification example.

When the inspection address information SAI includes the address of the mask region information MAI, an output of data such as an encryption key for user data and PIN information may be inhibited, and the data such as the encryption key for user data and PIN information may be deleted and then changed later in a third modification example.

[Scrambling and Transmission of Inspection Information in Storage Device 14]

The inspection information IS stored in the DRAM 31 is subjected to scrambling processing using the tag information TAG and is then stored as scrambled inspection information ISs for transmission in the DRAM 31. The scrambling/descrambling section 53 performs the scrambling of the inspection information IS by the method that is the same as the method illustrated in FIG. 8.

The storage device 14 scrambles the inspection information and transmits the scrambled inspection information to the PC 15. The inspection information generation/transmission section 52 and the data processing section 54 constitute a transmission data generation section configured to process (change or delete) data stored at a predetermined address from data related to the inspection information request command LRC to generate data for transmission when an address at which the data related to the inspection information request command LRC is stored includes the predetermined address. The inspection information generation/transmission section 52 and the scrambling/descrambling section 53 constitute a data transmission section configured to scramble the data for transmission using the tag information TAG and transmit the scrambled data to the PC 15. The scrambling/descrambling section 53 scrambles the data for transmission using the mask pattern M generated by hashing the tag information TAG with the hash function when the data for transmission is scrambled.

The scrambled inspection information ISs is transmitted to the PC 15 and is then transmitted from the PC 15 to the server 11. The scrambled inspection information ISs does not include data such as an encryption key for user data and PIN information

[Descrambling of Inspection Information in Server 11]

If the server 11 receives the scrambled inspection information ISs, then the server 11 performs descrambling using the tag information TAG to generate the plaintext inspection information IS. The descrambling of the scrambled inspection information ISs is performed by the method that is the same as the method illustrated in FIG. 9.

The processing is performed by the inspection information request/acquisition section 42 and the scrambling/descrambling section 43. The inspection information request/acquisition section 42 and the scrambling/descrambling section 43 constitute a data generation section configured to descramble or decrypt the received data using the received tag information TAG to generate the plaintext inspection information IS. The plaintext inspection information IS is used for analysis for inspecting the reasons of the malfunction of the storage device 14.

Note that the PC 15 can send a control signal for resetting the storage device 14 or for turning off the power of the storage device 14 to the storage device 14. If the controller 14a receives a command for providing an instruction for resetting the storage device 14 or an instruction for turning off the power of the storage device 14, then the controller 14a resets the storage device 14 or turns off the power of the storage device 14. Since the tag information TAG is stored in the SRAM 29, the service engineer can delete the tag information TAG by resetting the storage device 14 or turning off the power of the storage device 14 after acquisition of the inspection information IS. Thereafter, the generated tag information TAG becomes invalid in the storage device 14.

Figure 11:
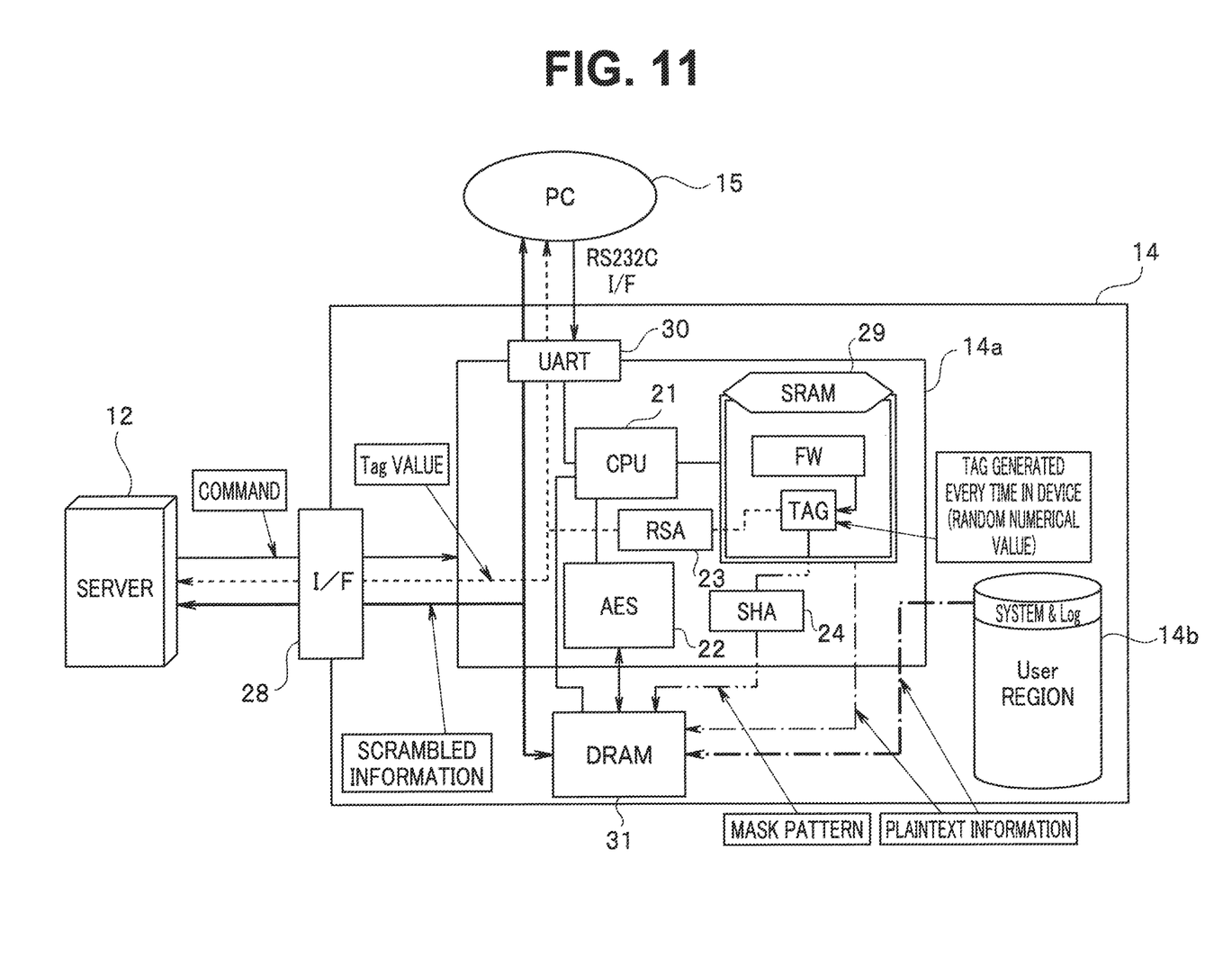
FIG. 11 is a diagram for explaining relations and a flow of data in the storage device according to the embodiment.

FIG. 11 is a diagram for explaining relations and a flow of data in the storage device 14. In FIG. 11, the thick solid lines represent flows of scrambled information. The thin lines represent flows of commands. The dashed lines represent flows of tag data. The thick one-dotted dashed line represents a flow of the plaintext inspection information from the memory device 14b. The thin one-dotted dashed line represents a flow of the plaintext inspection information from the SRAM 29. The two-dotted dashed line represents a flow of a mask pattern.

According to the embodiment, it is possible to securely transmit the inspection information to the manufacturer A and to quickly perform analysis without sending the storage device 14, which has caused a malfunction, to the manufacturer A for repairment or without the service engineer visiting the customer B as described above.

The tag information is securely transmitted from the storage device 14 to the server 11 using the secret key and the public key used for a digital signature function, and the address information of the inspection information is encrypted with the mask pattern using the tag information. In this manner, it is also possible to securely transmit the address information of the inspection information from the server 11 to the storage device 14. Since processing such as authentication is not performed before transmission and reception of the inspection information, it is possible to easily and quickly transmit the inspection information of the storage device 14 to the manufacturer A and to quickly inspect the reasons of the malfunction and address the malfunction.

Since only the manufacturer A that has the secret key knows the tag information TAG, it is not possible for persons other than the manufacturer A that has the secret key to decrypt the scrambled inspection information ISs.

Further, the tag information TAG is generated in the storage device 14 every time the tag generation request is issued. Since the tag information TAG is stored in the volatile memory in the storage device 14, the tag information TAG is completely deleted if the power of the storage device 14 is turned off or the storage device 14 is reset. Therefore, it is possible to keep the transmitted inspection information in a secure state.

Also, transmission and reception of the scrambled data using the hash function is used. Therefore, the storage device 14 can encrypt and transmit the inspection information IS even if the storage device 14 is a non-encryption device that does not have an encryption circuit such as an AES.

When the storage device 14 is an encryption device, the inspection information IS may be encrypted using the AES 22 and may be transmitted from the storage device 14 to the server 11.

The manufacturer A can acquire the inspection information IS by specifying a range in order not to acquire unnecessary information. Further, when information that is not to be transmitted, for example, information such as encrypting parameter data of the encryption device is included in the specified range, the storage device 14 can also inhibit the transmission of the information.

Although the aforementioned embodiment is an example in which the customer is a company that runs a data center, the customer may be an individual customer.

According to the embodiment, it is possible to provide a data transfer control device, a data transfer control system, and a data transfer control method capable of limiting a range of inspection information to be acquired from stored data and securely transferring the inspection information as described above.

While certain embodiments have been described, these embodiments have been presented by way of example only, and are not intended to limit the scope of the inventions. Indeed, the novel methods, devices and systems described herein may be embodied in a variety of other forms; furthermore, various omissions, substitutions and changes in the form of the methods, devices and systems described herein may be made without departing from the gist of the inventions. The accompanying claims and their equivalents are intended to cover such forms or modifications as would fall within the scope and gist of the inventions.

What is claimed is:

1. A data transfer control device that has a controller and that controls transfer of data stored in a memory device in response to a data transfer request,
   wherein the controller is configured to:
      generate tag information in response to receiving a tag generation request, encrypt the tag information, and transmit the encrypted tag information to a device from which the tag generation request was transmitted,
      process data stored at a predetermined address to generate data for transmission in a case in which an address at which data related to the data transfer request is stored includes the predetermined address, the data for transmission comprising data to be transmitted to the device, and the controller being configured to process the data stored at the predetermined address by deleting the data stored at the predetermined address from the data related to the data transfer request such that the data stored at the predetermined address is not included in the data for transmission, and
      using the tag information, scramble or encrypt the data for transmission having been processed to delete the data stored at the predetermined address, and transmit the scrambled or encrypted data to the device.

2. The data transfer control device according to claim 1, wherein the controller is configured to generate the encrypted tag information through asymmetric key encryption processing.

3. The data transfer control device according to claim 2, wherein:
   the tag information is a random numerical value, and
   the encrypted tag information is generated by concealing the random numerical value with a public key in the asymmetric key encryption processing.

4. The data transfer control device according to claim 1, further comprising:
   a volatile memory,
   wherein the tag information is stored in the volatile memory.

5. The data transfer control device according to claim 1, wherein the controller is configured to scramble the data for transmission using a mask pattern generated by hashing the tag information with a hash function.

6. The data transfer control device according to claim 5, wherein the mask pattern is generated by repeatedly using data obtained by hashing an exclusive OR between the mask pattern and the tag information as a next mask pattern.

7. The data transfer control device according to claim 1, wherein the controller is configured to delete the data stored at the predetermined address from the data related to the data transfer request by changing the data stored at the predetermined address to a specific value.

8. A data transfer control system comprising:
   a first device including a memory device configured to store data; and
   a second device communicably connected with the first device,
   wherein a controller of the first device is configured to:
      generate tag information in response to receiving a tag generation request from the second device, encrypt the tag information, and transmit the encrypted tag information to the second device,
      process data stored at a predetermined address to generate data for transmission in a case in which an address at which data related to a data transfer request received from the second device is stored includes the predetermined address, the data for transmission comprising data to the transmitted to the second device, and the controller being configured to process the data stored at the predetermined address by deleting the data stored at the predetermined address from the data related to the data transfer request such that the data stored at the predetermined address is not included in the data for transmission, and
      using the tag information, scramble or encrypt the data for transmission having been processed to delete the data stored at the predetermined address, and transmit the scrambled or encrypted data to the second device, and
   a processor of the second device is configured to:
      transmit the tag generation request to the first device and then transmit the data transfer request to the first device,
      decrypt the encrypted tag information received from the first device to obtain the tag information; and
      generate data by descrambling or decrypting the scrambled or encrypted data received from the first device using the tag information.

9. The data transfer control system according to claim 8, wherein:
   the processor of the second device is configured to encrypt the address using the tag information and to transmit the encrypted address to the first device, and
   the controller of the first device acquires the address by decrypting the encrypted address received from the second device using the tag information.

10. A data transfer control method for transferring data from a first device including a memory device configured to store the data to a second device communicably connected with the first device, the method comprising:
   by the second device, transmitting a tag generation request to the first device and then transmitting a data transfer request to the first device;
   by the first device, generating tag information in response to receiving the tag generation request from the second device, encrypting the tag information, and transmitting the encrypted tag information to the second device;
   by the first device, processing data stored at a predetermined address to generate data for transmission in a case in which an address at which data related to a data transfer request received from the second device is stored includes the predetermined address, the data for transmission comprising data to be transmitted to the second device, and the first device being configured to process the data stored at the predetermined address by deleting the data stored at the predetermined address from the data related to the data transfer request such that the data stored at the predetermined address is not included in the data for transmission;

by the first device, using the tag information, scrambling or encrypting the data for transmission having been processed to delete the data stored at the predetermined address, and transmitting the scrambled or encrypted data to the second device;

by the second device, decrypting the encrypted tag information received from the first device to obtain the tag information; and by the second device, generating data by descrambling or decrypting the scrambled or encrypted data received from the first device using the tag information.

11. The data transfer control method according to claim 10, wherein:
the second device encrypts the address using the tag information and transmits the encrypted address to the first device, and
the first device acquires the address by decrypting the encrypted address received from the second device using the tag information.

12. The data transfer control method according to claim 10, wherein the encrypted tag information is generated through asymmetric key encryption processing.

13. The data transfer control method according to claim 12, wherein:
the tag information is a random numerical value, and
the encrypted tag information is generated by concealing the random numerical value with a public key in the asymmetric key encryption processing.

14. The data transfer control method according to claim 10, wherein:
the first device has a volatile memory, and
the tag information is stored in the volatile memory.

15. The data transfer control method according to claim 10, wherein the data for transmission is scrambled using a mask pattern generated by hashing the tag information with a hash function.

16. The data transfer control method according to claim 15, wherein the mask pattern is generated by repeatedly using data obtained by hashing an exclusive OR between the mask pattern and the tag information as a next mask pattern.

17. The data transfer control method according to claim 10, wherein the first device is configured to delete the data stored at the predetermined address from the data related to the data transfer request by changing the data stored at the predetermined address to a specific value.

* * * * *